(12) United States Patent
Zakorzhevsky et al.

(10) Patent No.: US 9,501,643 B1
(45) Date of Patent: Nov. 22, 2016

(54) SYSTEMS AND METHODS FOR DETECTING MALICIOUS EXECUTABLE FILES CONTAINING AN INTERPRETER BY COMBINING EMULATORS

(71) Applicant: AO KASPERSKY LAB, Moscow (RU)

(72) Inventors: Vyacheslav V. Zakorzhevsky, Moscow (RU); Dmitry V. Vinogradov, Moscow (RU); Vladislav V. Pintiysky, Moscow (RU); Dmitry A. Kirsanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 15/015,387

(22) Filed: Feb. 4, 2016

(30) Foreign Application Priority Data

Sep. 30, 2015 (RU) ................................ 2015141543

(51) Int. Cl.
*G06F 21/56* (2013.01)
*G06F 21/12* (2013.01)
*G06F 21/14* (2013.01)

(52) U.S. Cl.
CPC ........... *G06F 21/563* (2013.01); *G06F 21/125* (2013.01); *G06F 21/14* (2013.01)

(58) Field of Classification Search
CPC ..... G06F 21/14; G06F 21/125; G06F 21/563
USPC ....................................................... 713/164
See application file for complete search history.

(56) References Cited

U.S. PATENT DOCUMENTS

| | | | |
|---|---|---|---|
| 6,643,775 B1 * | 11/2003 | Granger | G06F 21/123 380/255 |
| 7,013,483 B2 | 3/2006 | Cohen et al. | |
| 7,069,583 B2 | 6/2006 | Yann et al. | |
| 7,636,856 B2 | 12/2009 | Gheorghescu et al. | |
| 7,636,945 B2 | 12/2009 | Chandnani et al. | |
| 7,779,472 B1 | 8/2010 | Lou | |
| 8,037,535 B2 | 10/2011 | Maloof | |
| 8,151,352 B1 | 4/2012 | Novitchi | |
| 8,341,743 B2 | 12/2012 | Rogers et al. | |
| 8,365,286 B2 | 1/2013 | Poston | |
| 8,365,297 B1 * | 1/2013 | Parshin | G06F 21/575 713/2 |
| 9,038,184 B1 | 5/2015 | Mann | |
| 9,171,160 B2 | 10/2015 | Vincent et al. | |
| 2002/0073330 A1 | 6/2002 | Chandnani et al. | |
| 2002/0078368 A1 * | 6/2002 | Yann | G06F 21/563 726/24 |
| 2004/0181677 A1 | 9/2004 | Hong et al. | |
| 2006/0123244 A1 | 6/2006 | Gheorghescu et al. | |

(Continued)

*Primary Examiner* — Dao Ho
(74) *Attorney, Agent, or Firm* — Patterson Thuente Pedersen P.A.

(57) ABSTRACT

Systems and methods to detect malicious executable files having a script language interpreter by combining a script emulator and a machine code emulator. A system includes an analyzer configured to convert a script into pseudocode and monitor an emulation process of the pseudocode, a script emulator configured to sequentially emulate the pseudocode and write emulation results to an emulator operation log, and a machine code emulator configured to emulate the pseudocode if a transition from pseudocode to machine code is detected by the analyzer, such that the analyzer can analyze the emulator operation log to determine if the executable file is malicious.

17 Claims, 5 Drawing Sheets

(56) References Cited

U.S. PATENT DOCUMENTS

| | | | | |
|---|---|---|---|---|
| 2006/0225124 A1* | 10/2006 | Kolawa | | G06F 21/6218 726/1 |
| 2009/0126015 A1 | 5/2009 | Monastyrsky et al. | | |
| 2009/0126016 A1 | 5/2009 | Sobko et al. | | |
| 2010/0132038 A1 | 5/2010 | Zaitsev | | |
| 2011/0197177 A1* | 8/2011 | Mony | | G06F 8/51 717/115 |
| 2011/0283359 A1* | 11/2011 | Prince | | H04L 63/1458 726/23 |
| 2012/0117239 A1* | 5/2012 | Holloway | | H04L 61/1511 709/226 |
| 2012/0159629 A1* | 6/2012 | Lee | | G06F 21/566 726/24 |
| 2012/0240183 A1* | 9/2012 | Sinha | | H04W 12/08 726/1 |

* cited by examiner

SYSTEMS AND METHODS FOR DETECTING MALICIOUS EXECUTABLE FILES CONTAINING AN INTERPRETER BY COMBINING EMULATORS

RELATED APPLICATION

This Application claims the benefit of Russian Federation Patent Application No. 2015141543 filed Sep. 30, 2015, which is fully incorporated by reference herein.

TECHNICAL FIELD

The invention relates generally to antivirus solutions. More particularly, the present invention relates to the detection of malicious objects using emulation.

BACKGROUND

The code of today's programs, including malicious ones, can include a complex set of instructions: shifts, calls, cycles, etc. Further, the complexity of executable files is constantly increasing, due to the growing popularity of high-level programming languages and to the increasing sophistication of computer equipment and operating systems. Such complexity applies to both trusted and malicious applications alike. Malicious applications can perform a number of negative and undesirable (from the user's point of view) actions. Examples of such actions are: theft of passwords and other confidential user data, connection of a computer to a bot network in order to make DDoS attacks or to send spam, or blockage of the system operation in order to extort money.

AutoIt is a freeware programming language for the automation of tasks in Microsoft Windows. In early versions, software written in AutoIt was primarily used to create automation scripts for Microsoft Windows programs. Automation scripts are useful for performing repetitive tasks, like installation of identical program sets on a large number of computers. In later versions of AutoIt, the functionality of the language substantially increased, which brought AutoIt closer to general-purpose programming languages. A script written in the AutoIt language can be compiled into an executable file independent of any libraries. Virus writers have understandably been attracted to the AutoIt script language because of the broad capabilities of the language and the final form of representation of a script as an executable file, which is convenient for distribution.

As a result, detecting malicious objects in executable files compiled in the AutoIt script language is necessary for computing security. In one example, applying traditional signature-based methods of detection of malicious objects to executable files compiled in the AutoIt script language is difficult. In such methods, the script may be obfuscated and the executable file itself may be adversely packed by compressing and/or encrypting the executable file and by attaching a code to it, which is needed for unpacking and execution. In another example, traditional heuristic methods to detect malicious objects (in particular, emulation of such executable files) are also ineffective. In such methods, the presence of an interpreter (an unchangeable part of any executable file containing an AutoIt script), comprises very slow emulation operations. As a result, virus writers can easily prevent detection by making the interpreter perform many useless actions. Virus writers can also easily counter traditional systems for detection of malicious objects based on the launch of an executable file on a virtual machine. For example, a simple pause in the execution (a call for the Sleep command, for example) and large useless cycles in the script code are not used by the detection system in order to issue a verdict; rather, the system completes the examination upon expiry of an allocated time (operation timeout) before the malicious object begins performing malicious actions. In such cases, the size of the execution log of such a file can reach gigabytes.

Therefore, there is a need for systems and methods for the efficient detection of malicious executable files having a script language interpreter.

SUMMARY

Embodiments substantially meet the aforementioned needs of the industry. According to embodiments, systems and methods of the invention are configured to detect malicious executable files including a script language interpreter by combining a script emulator and a machine code emulator. As a result of such embodiments, the security of computer systems is increased. More generally, computer security is achieved by detecting malicious executable files using a combination of emulators.

In an embodiment, a system for detecting a malicious executable file, the executable file including an interpreter comprises a computing platform including computing hardware of at least one processor, data storage, an operating system implemented on the computing hardware, and input/output facilities; instructions that, when executed on the computing platform, cause the computing platform to implement an analyzer configured to convert a script into pseudocode, the script being related to the executable file, and monitor an emulation process of the pseudocode, a script emulator configured to sequentially emulate the pseudocode and write emulation results to an emulator operation log, and a machine code emulator configured to emulate the pseudocode if a transition from pseudocode to machine code is detected by the analyzer, wherein the analyzer is further configured to analyze the emulator operation log to determine if the executable file is malicious.

In another embodiment, a machine-implemented method for detecting a malicious executable file for a computer system, the computing system including computing hardware of at least one processor, data storage, an operating system implemented on the computing hardware, and input/output facilities the executable file including an interpreter, comprises converting a script into pseudocode using an analyzer executing on the at least one processor, the script being related to the executable file; emulating the pseudocode using a script emulator executing on the at least one processor, the script emulator configured to process commands within the script; emulating the pseudocode using a machine code emulator if a transition from pseudocode to machine code is detected, the machine code emulator executing on the at least one processor; writing an emulation result in an emulator operation log stored on the data storage; and analyzing, with the analyzer, the emulator operation log to determine if the executable file is malicious.

In another embodiment, a multithreaded computing system for detecting a malicious executable file, the executable file including an interpreter, comprises at least one processor; memory operably coupled to the at least one processor; a first execution thread implemented by the at least one processor and executing an analyzer configured to convert a script into pseudocode, the script contained in the executable file or configured for execution by the interpreter; a second execution thread implemented by the at least one processor and executing a script emulator configured to sequentially emulate the pseudocode and output a script emulator result; and a third execution thread implemented by the at least one processor and executing a machine code emulator configured to emulate the pseudocode if a transition from pseudocode to machine code is detected and output a machine code emulator result, wherein the analyzer is further configured to analyze the script emulator result and the machine code emulator result to determine if the executable file is malicious to the multithreaded computing system.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

According to an embodiment, systems and methods are configured to perform an analysis of executable files compiled from scripts written, for example, in the AutoIt language. A necessary feature of such executable files is the inclusion of an interpreter. Therefore, "executable files" hereinafter refers to executable files comprising an interpreter. In order to detect malicious executable files, an emulation of the scripts contained in the executable files can be performed. Such emulation saves time, which is currently insufficient, in the case of emulation of the executable file itself. However, in case of a direct emulation of a script, a smaller number of execution media variables are monitored, in comparison with a classic emulation of machine code. Therefore, if only script emulation is performed, there is a chance of misinterpreting an executable file as a trusted file (or a "clean" or non-malicious file), due to the inability to completely examine the script's behavior. For this reason, embodiments of the invention are configured to examine executable files according to a less resource-consuming emulation of scripts with an occasionally more resource-consuming classic emulation of machine code.

Emulation is one method for examining potentially malicious programs, which can include executable files. This examination method is used in the antivirus industry to analyze program behavior. Various emulation methods can be implemented. One emulation method comprises classic emulation using a machine code emulator. Classic emulation includes a software-based imitation of the processor, memory, and other devices by creating virtual copies of the processor and memory registries and of a set of processor instructions. In this manner, the program instructions are executed not on an actual physical processor but on a virtual copy, while the calls for system API functions are emulated and the emulated result of a function's operation is sent in reply.

It should be noted that the emulator initialization process can be rather resource-consuming. Emulator initialization can include not only the creation of a virtual copy of the necessary hardware (processor, RAM), but also creation of virtual copies of several key components of the operating system (OS) in which the application's execution is emulated. The key components of the OS are: the portion of the operating system kernel responsible for the necessary features of OS operation, such as processing of interrupts and exclusions; the drivers of the required devices, and the memory manager, for example. Therefore, a correct "playback" (emulation) of a working OS requires significant computer system resources to be expended. For this reason, in addition to the resource-consuming machine code emulator, the proposed invention also uses a lightened version, a script emulator, which can process commands within a script but cannot process, for example, calls for API functions. During the execution of an application in an actual OS, when a call for an API function occurs, the OS performs a large number of operations due to the complex internal architecture. In embodiments, a script emulator is not tied to the architecture of any specific operating system. Schematically, a call for an API function results in the execution of a large number of instructions on the processor, after which the result of the operation of the called API function is returned to the application. With a machine code emulator, a call for an API function does not result in the execution of the same number of instructions as it does in an actual OS, but, instead, an emulated result of the API function operation is returned to the application. For example, when an attempt is made to create a file, the emulator will return a pointer to a virtual file.

A script emulator, unlike a machine code emulator, includes an interpreter, and does not have virtual copies of operating system components. An interpreter can work with both the original script code and a pseudo code. A pseudo code is an intermediary representation form (code) between commands readily decipherable to a human user. For example, pseudo code can include commands of the programming language in which the script is written (for example, the AutoIt programming language), as well as commands understandable to their processing tool, which, in this case, is the interpreter within the script emulator. In programming parlance, pseudo code is also known as bytecode or p-code. In comparison to an original script code, pseudo code is a compact representation of a script that is easy to analyze and to understand for a human user, and can be obtained, for example, by decompilation. Technically, pseudo code is a machine-independent low level code generated by a translator (in embodiments, this function is performed by an analyzer, described below) from the original script code. The use of a pseudo code allows the interpreter to operate easier and faster. Pseudo code can look like machine code but is intended to be executed by a virtual machine, not by an actual processor. The virtual machine, according to embodiments, comprises an interpreter of a script language (for example, the AutoIt programming language). According to embodiments, the length of each operation code can be one byte. Each instruction is generally a one-byte operation code (from 0 to 255), which can be followed by various parameters, such as a registry number or an address in memory. A single script in pseudo code can be executed by the interpreter on different platforms and architectures for which the interpreter is executed or generated. This is in contrast to machine code, which is architecture-dependent code.

A primary operational algorithm of a script emulator can include reading the command in pseudo code, determining the relevant actions using an interpreter; performing emulation of the relevant actions, and writing the result of the emulation to the emulator operation log. A script emulator thereby reduces resource consumption and accelerates examination of the executable file containing the script language interpreter and the script related to it. However, during script execution emulation, it is possible to transition from the pseudo code, which the interpreter processes in the script emulator, to machine code, the emulation of the execution of which requires the launch of a machine code emulator. Such transition can be made if, during the emulation process, a code is detected which is related to, for example, calls for API functions of the operating system, calls for functions from dynamic libraries, accessing resources of the executable file, and code that cannot be processed by a script emulator. Transitions can be made to a machine code emulator based on other conditions, as will be readily understood by one skilled in the art.

It should be noted that a machine code emulator can interface with and otherwise work with all libraries and interpreters present in the operating system (for example, .NET, Java, AutoIt, etc.). A machine code emulator also can also perform emulation of batch and control files, such as a batch file with .bat or .cmd extensions, powershell scripts, AutoIt scripts, reg files for entering data in a registry, and other file types, the launch of which results in the execution of the code on a user's computer. Therefore, in an embodiment, even if the emulation process is switched to a machine code emulator during the emulation of a first script, and if a second script is launched for execution (for example, a script contained in the resources of the executable file), this second script can also be processed by the machine code emulator. Subsequently, emulation can be switched back to the emulation of the first script contained in the executable file. In another embodiment, if the emulation process is switched to a machine code emulator, and if a second script is launched for execution during machine code emulation, the emulation process can switch back to the script emulator. In yet another embodiment, an additional script emulator can be launched simultaneously to process a second script launched during operation of the machine code emulator. The results of the operation of the main script emulator, machine code emulator, and any additional script emulator(s) are written into a single common emulator operation log and are processed by an analyzer, as will be described further below.

Figure 1:
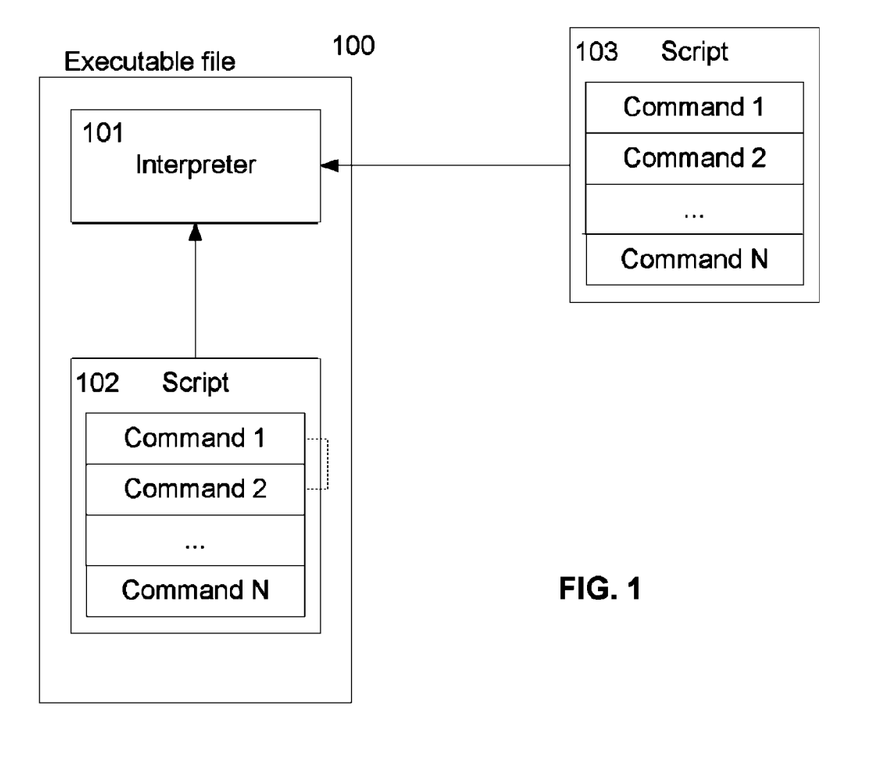
FIG. 1 is a block diagram of a structure of an executable file compiled using AutoIt, according to an embodiment.

FIG. 1 is a block diagram of a structure of an executable file 100 compiled using AutoIt, according to an embodiment. As depicted, executable file 100 can include two primary components. For example, executable file 100 includes script 102, which is contained in the executable file 100, and an interpreter 101. In an embodiment, script 102 can be written in the AutoIt language. Interpreter 101 can be built in any executable file 100 compiled from script 102. If script 102 is compiled without the #NoAutoIt3Execute directive, (thereby preventing the interpreter from executing outside scenarios), interpreter 101 can be used to execute the code of a second script 103. Second script 103 can also be written in the AutoIt language. There are two methods for executing the code:

using the "/AutoIt3ExecuteLine" parameter, through which code written in the AutoIt language is sent directly to the interpreter for execution, for example: "% ProgramFiles %\AutoItFile_PE.exe"/ AutoIt3ExecuteLine "MsgBox(0, 'Hello', 'World')"

using the "/AutoIt3ExecuteScript" parameter, through which a script written in the AutoIt language is sent to the interpreter for execution, for example: "% ProgramFiles%\AutoItFile_PE. exe"/ AutoIt3ExecuteScript "C:\Temp\Script.au3"

The possibility of executing a script 103 through interpreter 101 of executable file 100 containing script 102 allows virus writers to make multi-component malicious objects. Accordingly, each component can be individually considered and trusted following an antivirus check. For example, executable file 100 can include an encrypted malicious code located in the executable file resources, but at the normal launch of executable file 100, through interpreter 101, script 102 is executed, which does not result in decryption and launch of the malicious code. However, when executable file 100 is launched with the "/AutoIt3ExecuteScript" parameter, thereby commanding script 103 to be sent to interpreter 101 for execution, the resources of executable file 100 are accessed, and the malicious code is decrypted and executed. In this case, executable file 100 can be launched by a third component, such as script 103 loaded from the Internet. In order to detect multi-component malicious executable files, the emulation process must be started from script 103; for example, a script that is external to interpreter 101. In order to detect single-component malicious executable files, the emulation process starts from script 102. Accordingly, in one embodiment, the event of the launch of an executable file 100 can be intercepted, and, if the parameters with which the launch of the executable file 100 was attempted include a script, the emulation process begins from the script transmitted in the parameters. If such parameters are absent, the emulation process begins from script 102, which is contained in executable file 100 under examination.

Figure 2:
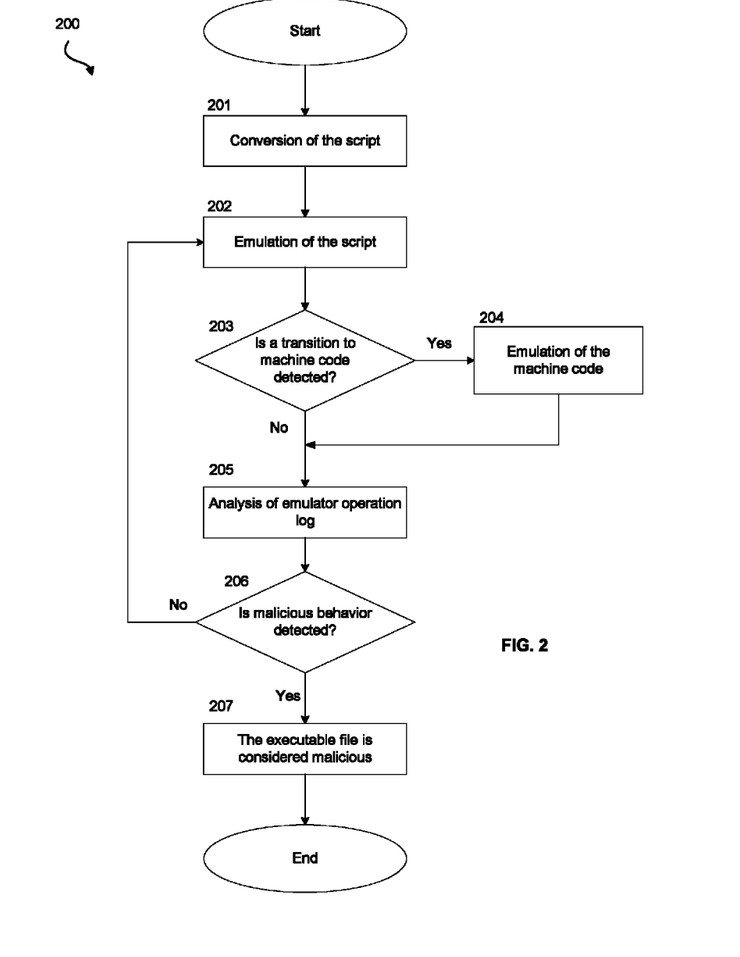
FIG. 2 is a flow diagram for a method for detecting a malicious executable file, according to an embodiment.

FIG. 2 is a flow diagram for a method 200 for detecting a malicious executable file containing a script, according to an embodiment. For example, the executable file being examined in FIG. 2 can include executable file 100 as shown in FIG. 1. Referring to FIG. 2, method 200 includes script conversion 201 which converts the script under examination into pseudo code. The use of a pseudo code facilitates and accelerates the operation of the interpreter used in the script emulator. As mentioned above with respect to FIG. 1, a script being examined for maliciousness can be a script 102 contained in the executable file 100, or a script 103 sent for execution to the interpreter 101 of the executable file 100.

In order to be examined, the script 102 contained in the executable file 100 is first extracted from the executable file 100. In this case, if the script 102 was packed using packager programs, it is unpacked during its extraction. The extracted script 102 can undergo a decompilation procedure. For example the original code of script 102 is restored in the programming language in which the script was written. The decompilation of script 102 code is required to de-obfuscate the original code. De-obfuscation is a process of eliminating a code which complicates the analysis but does not change the functionality of the script. Such code can be, for example, useless calculations or individualized cycles whose calculation results are not used anywhere. However, if script 103 is being examined, then, before being converted into pseudo code, script 103 can be subjected to a de-obfuscation process.

After the conversion of a script into pseudo code, at 202, emulation of the execution of the pseudo code using a script emulator is conducted. At 203, if during the emulation of pseudo code execution, any transitions from pseudo code to machine code are detected, the emulation process is switched, at 204, to emulation of machine code execution. As mentioned above, such transitions can include calls for an operating system API function, calls for functions from dynamic libraries, accessing resources of the executable file, or a code that cannot be processed by a script emulator.

Upon completion of the machine code execution emulation 204, emulation switches back to emulation 202 of the execution of the pseudo code of the script being examined. During emulation of pseudo code and machine code execution, the emulation results are written in the emulator operation log. In other embodiments, emulation results can be stored temporarily in memory and written to the emulator operation log at the end of emulation. The emulator operation log is analyzed at 205 in order to detect malicious behavior. Routines or algorithms embodied by 202-205 can be repeated or iterated until the executable file is found to be malicious at 207 by detecting, at 206, malicious behavior as a result of an analysis of the emulator operation log at 205. In other embodiments, method 200 can exit upon no detection of malicious behavior according to an analysis of the emulator operation log at 205.

The emulator operation log contains actions performed by executable file 100 at launch, including suspicious actions whose combination allows for the characterizing of the executable file as malicious. For example, suspicious actions can include, but are not limited to opening and writing into the file or interception of interrupt vectors.

In an embodiment, the analysis of the emulator operation log comprises comparing the content of the emulator operation log with malicious behavior templates. Executable file 100 can be found to be malicious based on a match of the content of the emulator operation log content and malicious behavior templates.

In another embodiment, the executable file 100 is found to be malicious during the analysis of the emulator operation log by detection of suspicious actions. In embodiments, each time a suspicious action is detected in the emulator operation log, a counter can be incremented. For example, a "suspicion meter" counter of executable file 100 can be increased each time a suspicious action is detected in the emulator operation log. If the value of this meter exceeds a threshold value, the executable file can be found to be malicious.

Figure 3:
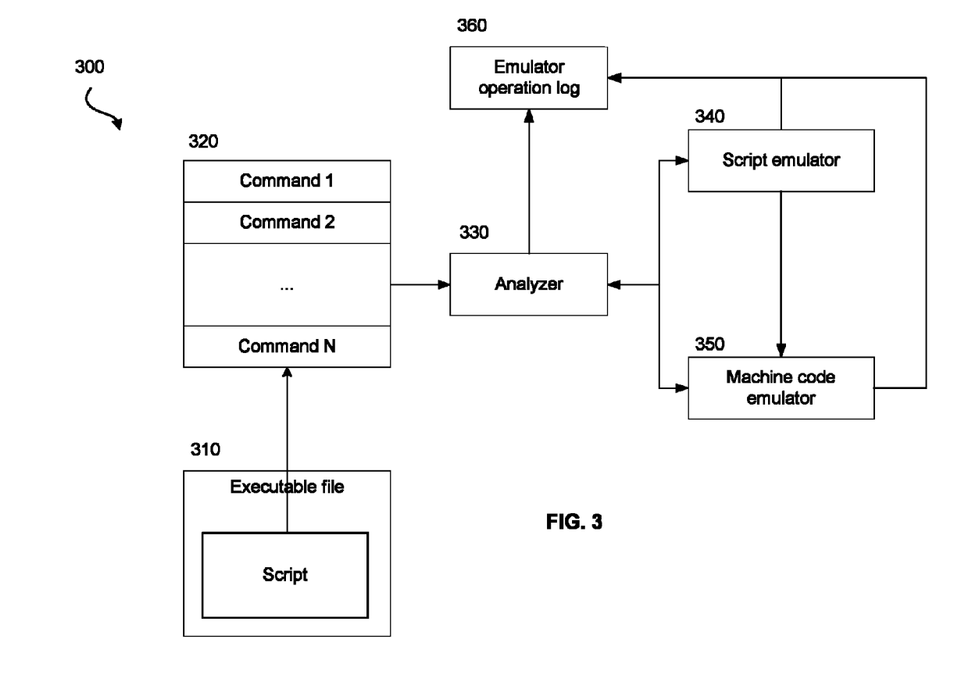
FIG. 3 is a block diagram of a system for detecting a malicious executable file, according to an embodiment.

FIG. 3 is a block diagram of a system 300 for detecting a malicious executable file, according to an embodiment. In an embodiment, a user computer can include an executable file 310 comprising a script 320 to be evaluated in order to determine whether executable file 310 is malicious. System 300 further comprises an analyzer 330, a script emulator 340, a machine code emulator 350, and an emulator operation log 360.

Because executable file 310 contains script 320, the resource and time consumption for the emulation of the executable file can be significantly reduced by extracting script 320 and emulating it directly using script emulator 340. Script 320 is extracted by decompiling executable file 310, and, if necessary, by unpacking script 320 if it was packed using a packager. In an embodiment, analyzer 330 can be configured to automatically perform the extraction and unpacking.

Before sending script 320 for execution to script emulator 340, the analyzer 330 converts the commands from the script 320 into pseudo code—a language processed by script emulator 340. Also, to facilitate the subsequent emulation process, the code from script 340 can be subjected to a de-obfuscation procedure, which is performed before converting script 320 into pseudo code. Once script 320 that has been converted into pseudo code is sent for execution, script emulator 340 sequentially emulates the execution of the pseudo code and writes the emulation results to emulator operation log 360. Analyzer 330 is configured to monitor the emulation process being performed by script emulator 340, and if, during the emulation, a transition from pseudo code to machine code is detected, analyzer 330 switches the emulation process to machine code emulator 350. As described above, a transition from pseudo code to machine code to execute machine code emulator 350 from script emulator 340 can be triggered by calls for an operating system API function, calls for functions from dynamic libraries, accessing resources of the executable file, and code that cannot be processed by the script emulator.

When the emulation process is switched to machine code emulator 350, analyzer 330 suspends the operation of script emulator 340, and machine code emulator 350 begins emulating the execution of the machine code and writes the emulation results to the emulator operation log 360. The pseudo code execution emulation using script emulator 340 can be resumed by analyzer 330 upon completion of the machine code execution emulation. In another embodiment, switching to the machine code emulator 350 is done by script emulator 340. Analyzer 330 can perform continuous analysis of the emulator operation log 360 in order to detect malicious functionality (malicious behavior), and conclude that executable file 310 containing script 320 is malicious. Executable file 310 can be considered trusted if, after emulation of the entire pseudo code and machine code and subsequent analysis of the emulator operation log 360, no malicious functionality is detected. Also, executable file 310 can be considered trusted by analyzer 330 if emulator operation log 360 built during the time allocated for the examination does not contain malicious functionality.

Figure 4:
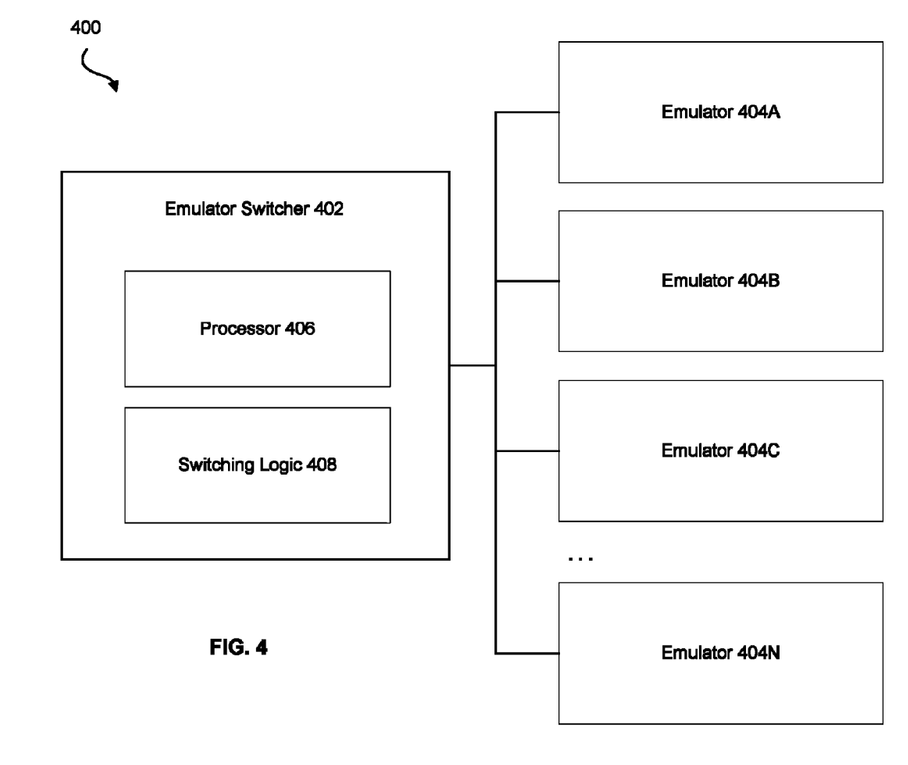
FIG. 4 is a block diagram of an emulation switching subsystem, according to an embodiment.

FIG. 4 is a block diagram of an emulation switching subsystem 400, according to an embodiment. For example, analyzer 330 can include emulation switching subsystem 400. Emulation switching subsystem 400 generally comprises emulator switcher 402 and a plurality of emulators 404A-404N.

Emulator switcher 402 includes a processor 406 and switching logic 408 configured to be interpreted by processor 406. In an embodiment, processor 406 can be any programmable device that accepts digital data as input, is configured to process the input according to instructions or algorithms, and provides results as outputs. In an embodiment, processor 406 can be a central processing unit (CPU) configured to carry out the instructions of a computer program. Processor 406 is therefore configured to perform basic arithmetical, logical, and input/output operations. However, processor 406 is particularly configured to switch between emulators 404A-404N, according to switching logic 408.

Switching logic 408 comprise instructions for processor 406 to switch between emulators 404A-404N. In an embodiment, switching logic 408 can comprise the aforementioned triggers for switching between a script emulator and a machine code emulator. In embodiments, one of emulators 404 can comprise a master emulator such that switching logic 408 returns emulation processing to the master emulator after calling one of the other emulators 404 for a particular task. In other embodiments, switching logic 408 can instruct emulators 404 to be executed concurrently.

Each of emulators 404 includes a virtual environment configured to understand a set of instructions in an instruction set. As is readily appreciated by one of skill in the art, all kinds of instructions can be processed differently. Each of emulators 404 therefore recreates a virtual environment to execute the instructions. If there are pseudocode instructions, the virtual environment can consist of only the interpreter of the language in which the original script is being written. Any number of emulators 404 can be implemented in system 400. Each emulator 404 can comprise a particular virtual environment unique to a set of instructions.

For example, in an embodiment of emulation switching subsystem 400 comprising emulator 404A and emulator 404B, emulator 404A can comprise a script emulator, and emulator 404B can comprise a machine code or binary emulator. Switching logic 408 can comprise instructions for processor 406 to switch between emulator 404A and emulator 404B if certain criteria are met such that the script emulator 404A cannot process the code under emulation or if it is desirable for a different emulator 404B to process the code under emulation. For example, switching logic 408 can include triggers from emulator 404A to emulator 404B such as calls for an operating system API function, calls for functions from dynamic libraries, accessing resources of the executable file, or a code that cannot be processed by a script emulator.

Figure 5:
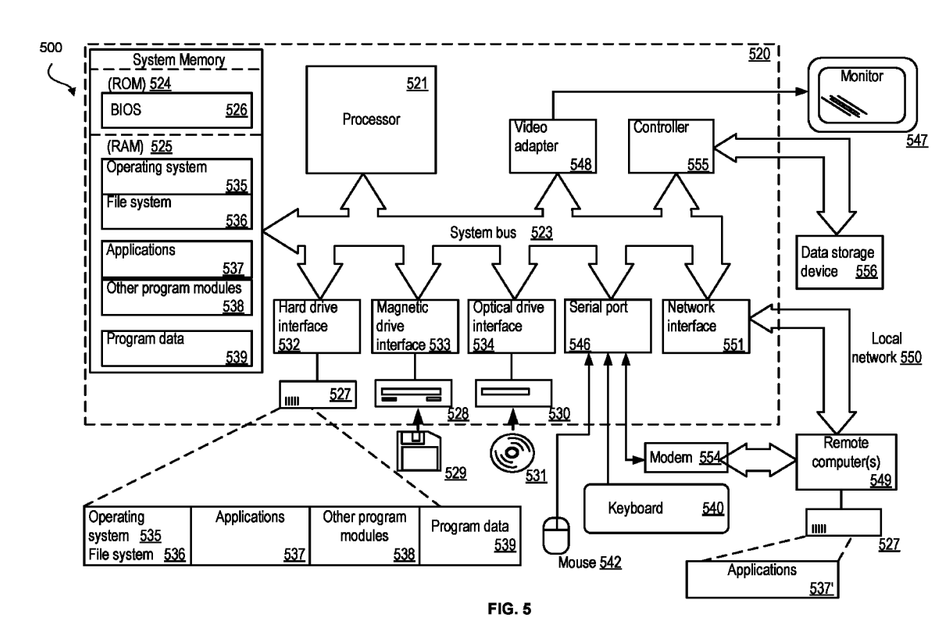
FIG. 5 is a block diagram of a computer system configured to implement embodiments of the invention.

FIG. 5 is a diagram illustrating in greater detail a computer system 500 on which aspects of the invention as described herein may be implemented according to various embodiments.

The computer system 500 can comprise a computing device such as a personal computer 520 includes one or more processing units 521, a system memory 522 and a system bus 523, which contains various system components, including a memory connected with the one or more processing units 521. In various embodiments, the processing units 521 can include multiple logical cores that are able to process information stored on computer readable media. The system bus 523 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 524 or volatile memory such as Random Access Memory (RAM) 525. The Basic Input/Output System (BIOS) 526 contains basic procedures ensuring transfer of information between the elements of personal computer 520, for example, during the operating system boot using ROM 524.

Personal computer 520, in turn, has a hard drive 527 for data reading and writing, a magnetic disk drive 528 for reading and writing on removable magnetic disks 529, and an optical drive 530 for reading and writing on removable optical disks 531, such as CD-ROM, DVD-ROM and other optical media. The hard drive 527, the magnetic drive 528, and the optical drive 530 are connected with system bus 523 through a hard drive interface 532, a magnetic drive interface 533 and an optical drive interface 534, respectively. The drives and the corresponding computer information media represent energy-independent means for storage of computer instructions, data structures, program modules and other data on personal computer 520.

The system depicted includes hard drive 527, a removable magnetic drive 529 and a removable optical drive 530, but it should be understood that it is possible to use other types of computer media, capable of storing data in a computer-readable form (solid state drives, flash memory cards, digital disks, random-access memory (RAM), etc.), connected to system bus 523 through a controller 555.

The computer 520 comprises a file system 536, where the recorded operating system 535 is stored, as well as additional program applications 537, other program engines 538 and program data 539. The user can input commands and information into the personal computer 520 using input devices (keyboard 540, mouse 542). Other input devices (not shown) can also be used, such as: a microphone, a joystick, a game console, a scanner, etc. Such input devices are usually connected to the computer system 520 through a serial port 546, which, in turn, is connected to a system bus, but they can also be connected in a different way—for example, using a parallel port, a game port or a Universal Serial Bus (USB). The monitor 547 or another type of display device is also connected to system bus 523 through an interface, such as a video adapter 548. In addition to monitor 547, personal computer 520 can be equipped with other peripheral output devices (not shown), such as speakers, a printer, etc.

Personal computer 520 is able to work in a network environment; in this case, it uses a network connection with one or several other remote computers 549. Remote computer(s) 549 is (are) similar personal computers or servers, which have most or all of the above elements, noted earlier when describing the substance of personal computer 520 shown in FIG. 5. The computing network can also have other devices, such as routers, network stations, peering devices or other network nodes.

Network connections can constitute a Local Area Network (LAN) 550 and a World Area Network (WAN). Such networks are used in corporate computer networks or in corporate intranets, and usually have access to the Internet. In LAN or WAN networks, personal computer 520 is connected to the Local Area Network 550 through a network adapter or a network interface 551. When using networks, personal computer 520 can use a modem 554 or other means for connection to a world area network, such as the Internet. Modem 554, which is an internal or an external device, is connected to system bus 523 through serial port 546. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A system for detecting a malicious executable file, the executable file including an interpreter, the system comprising:
 a computing platform including computing hardware of at least one processor, data storage, an operating system implemented on the computing hardware, and input/output facilities;
 a memory operably coupled to the at least one processor and configured to store instructions invoked by the at least one processor, the instructions, when executed on the computing platform, cause the computing platform to implement:
  an analyzer configured to de-obfuscate a script prior to converting the script into pseudocode, the script being related to the executable file, convert the script into pseudocode, monitor an emulation process of the pseudocode, and detect a transition from pseudocode to machine code,
  a script emulator configured to sequentially emulate the pseudocode and write emulation results to an emulator operation log, and
  a machine code emulator configured to emulate the pseudocode when a transition from pseudocode to machine code is detected by the analyzer,
  wherein the analyzer is further configured to analyze the emulator operation log to determine when the executable file is malicious,
  wherein the instructions are implemented with a single thread of execution, the single thread of execution being configured to switch between the machine code emulator and the script emulator.

2. The system of claim 1, wherein the script is contained in the executable file.

3. The system of claim 2, wherein the analyzer is further configured to:
 extract the script from the executable file; and
 decompile the script to output original code in a programming language in which the script was written.

4. The system of claim 1, wherein the script is received by the input/output facilities for execution by the interpreter.

5. The system of claim 1, wherein the machine code emulator is further configured to emulate a second script launched during the emulation of the pseudocode using the machine code emulator.

6. The system of claim 1, wherein the instructions are implemented with multiple threads of execution, wherein a first thread of execution executing a machine code emulator is configured to launch a second thread of execution for executing a script emulator.

7. A machine-implemented method for detecting a malicious executable file for a computer system, the computing system including computing hardware of at least one processor, data storage, an operating system implemented on the computing hardware, and input/output facilities the executable file including an interpreter, the method comprising:
 de-obfuscating a script with an analyzer executing on the at least one processor prior to converting the script into pseudocode, the script being related to the executable file;
 converting the script into pseudocode using the analyzer;
 emulating the pseudocode using a script emulator executing on the at least one processor, the script emulator configured to process commands within the script;
 detecting, with the analyzer, a transition from pseudocode to machine code;
 emulating the pseudocode using a machine code emulator when a transition from pseudocode to machine code is detected, the machine code emulator executing on the at least one processor;
 writing an emulation result in an emulator operation log stored on the data storage; and
 analyzing, with the analyzer, the emulator operation log to determine when the executable file is malicious,
 wherein the method is executed with a single thread of execution, the single thread of execution being configured to switch between the machine code emulator and the script emulator.

8. The machine-implemented method of claim 7, wherein the script is contained in the executable file.

9. The machine-implemented method of claim 8, further comprising, prior to converting the script into pseudocode:
 extracting the script from the executable file; and
 decompiling the script to output original code in a programming language in which the script was written.

10. The machine-implemented method of claim 7, wherein the script is configured for execution by the interpreter.

11. The machine-implemented method of claim 7, wherein analyzing the emulator operation log to determine if the executable file is malicious comprises comparing the emulator operation log content with one or more malicious behavior templates stored in the data storage.

12. The machine-implemented method of claim 7, wherein analyzing the emulator operation log to determine if the executable file is malicious comprises incrementing a suspicion counter for every suspicious action detected in the emulator operation log and determining that the executable file is malicious if the suspicion counter exceeds a threshold value.

13. The machine-implemented method of claim 7, wherein emulating the script comprises:
   reading a pseudocode command;
   determining one or more relevant computing system resource actions using the interpreter; and
   performing an emulation of the one or more relevant computing system resource actions.

14. The machine-implemented method of claim 7, wherein a transition from pseudocode to machine code is detected upon at least one of a call for an API function of the operating system, a call for a function from a dynamic library stored on the data storage, a call for access of a resource of the executable file; or a pseudocode command that cannot be processed by the script emulator.

15. The machine-implemented method of claim 7, wherein the machine code emulator is further configured to emulate a second script launched during the emulation of the pseudocode using the machine code emulator.

16. The machine-implemented method of claim 7, wherein the method is executed with multiple threads of execution on the at least one processor, and wherein a first thread of execution executing a machine code emulator is configured to launch a second thread of execution executing a script emulator.

17. A multithreaded computing system for detecting a malicious executable file, the executable file including an interpreter, the system comprising:
   at least one processor;
   memory operably coupled to the at least one processor;
   a first execution thread implemented by the at least one processor and executing an analyzer configured to de-obfuscate a script prior to converting the script into pseudocode, the script contained in the executable file or configured for execution by the interpreter, convert a script into pseudocode, and detect a transition from pseudocode to machine code;
   a second execution thread implemented by the at least one processor and executing a script emulator configured to sequentially emulate the pseudocode and output a script emulator result; and
   a third execution thread implemented by the at least one processor and executing a machine code emulator configured to emulate the pseudocode when a transition from pseudocode to machine code is detected and output a machine code emulator result,
   wherein the analyzer is further configured to analyze the script emulator result and the machine code emulator result to determine when the executable file is malicious to the multithreaded computing system.

* * * * *